US011987666B2

(12) United States Patent
Kim et al.

(10) Patent No.: US 11,987,666 B2
(45) Date of Patent: May 21, 2024

(54) THERMOPLASTIC RESIN COMPOSITION AND MOLDED PRODUCT USING SAME

(71) Applicant: LOTTE CHEMICAL CORPORATION, Seoul (KR)

(72) Inventors: In-Chol Kim, Uiwang-si (KR); Keehae Kwon, Uiwang-si (KR)

(73) Assignee: Lotte Chemical Corporation, Seoul (KR)

(*) Notice: Subject to any disclaimer, the term of this patent is extended or adjusted under 35 U.S.C. 154(b) by 706 days.

(21) Appl. No.: 17/256,294

(22) PCT Filed: Jul. 1, 2019

(86) PCT No.: PCT/KR2019/007946
§ 371 (c)(1),
(2) Date: Dec. 28, 2020

(87) PCT Pub. No.: WO2020/005040
PCT Pub. Date: Jan. 2, 2020

(65) Prior Publication Data
US 2021/0261727 A1 Aug. 26, 2021

(30) Foreign Application Priority Data

Jun. 29, 2018 (KR) .................. 10-2018-0075811
Jun. 28, 2019 (KR) .................. 10-2019-0077961

(51) Int. Cl.
*C08G 63/183* (2006.01)
*C08F 210/02* (2006.01)
*C08F 220/18* (2006.01)
*C08F 220/32* (2006.01)
*C08K 3/04* (2006.01)
*C08K 5/5377* (2006.01)
*C08K 7/06* (2006.01)
*C08L 25/12* (2006.01)
*C08L 51/00* (2006.01)

(52) U.S. Cl.
CPC .......... *C08G 63/183* (2013.01); *C08F 210/02* (2013.01); *C08F 220/1804* (2020.02); *C08F 220/325* (2020.02); *C08K 3/041* (2017.05); *C08K 5/5377* (2013.01); *C08K 7/06* (2013.01); *C08L 25/12* (2013.01); *C08L 51/003* (2013.01); *C08K 2201/003* (2013.01); *C08K 2201/004* (2013.01); *C08K 2201/011* (2013.01); *C08L 2201/02* (2013.01); *C08L 2205/03* (2013.01); *C08L 2207/53* (2013.01)

(58) Field of Classification Search
CPC .... C08G 63/183; C08K 3/041; C08K 5/5313; C08K 7/06; C08F 220/1804; C08L 67/02; C08L 51/04; C08L 51/06
See application file for complete search history.

(56) References Cited

U.S. PATENT DOCUMENTS

| | | |
|---|---|---|
| 5,807,932 A | 9/1998 | Pfaendner et al. |
| 6,242,519 B1 | 6/2001 | Cheret et al. |
| 6,365,071 B1 | 4/2002 | Jenewein et al. |
| 6,469,078 B1 | 10/2002 | Simon et al. |
| 6,689,838 B1 | 2/2004 | Fischer et al. |
| 7,148,276 B2 | 12/2006 | Bauer et al. |
| 7,935,737 B2 | 5/2011 | Gopal et al. |
| 2006/0172097 A1 | 8/2006 | Morikoshi et al. |
| 2011/0204298 A1 | 8/2011 | Chang et al. |
| 2012/0016090 A1 | 1/2012 | Loos et al. |
| 2013/0244042 A1 | 9/2013 | Minder et al. |
| 2014/0238736 A1 | 8/2014 | Youm et al. |
| 2016/0052927 A1 | 2/2016 | Pfaendner et al. |

FOREIGN PATENT DOCUMENTS

| | | |
|---|---|---|
| JP | 3055162 B2 | 6/2000 |
| JP | 2005-309227 A | 11/2005 |
| KR | 10-2005-0058678 A | 4/2006 |
| KR | 10-0856137 B1 | 9/2008 |
| KR | 10-1201832 B1 | 9/2010 |
| KR | 10-1474799 B1 | 5/2013 |
| KR | 10-1355386 B1 | 8/2013 |

(Continued)

OTHER PUBLICATIONS

English Machine Translation of JP 3055162 originally published to Kawamura Takashi on Jun. 26, 2000, obtained on Aug. 23, 2023 from https://worldwide.espacenet.com/publicationDetails/biblio?DB=EPODOC&II=0&ND=3&adjacent=true&locale=en_EP&FT=D&date=20121226&CC=CN&NR=102838864A&KC=A# (Year: 2012).*
International Search Report in counterpart International Application No. PCT/KR2019/007946 dated Oct. 10, 2019, pp. 1-4.
Liu et al., "Reactive Compatibilization of Poly(Butylene Terephthalate)/Acrylonitrile-Styrene-Acrylate Blends by Epoxy Resin: Morphology and Mechanical Properties", Journal of Macromolecular Science, Part B, Physics, vol. 50, 2011, pp. 1780-1790.
Brauner et al., "Cure-dependent thermomechanical modelling of the stress relaxation behaviour of composite materials during manufacturing", Journal of Composite Materials, vol. 51, 2017, pp. 1005-1017.

*Primary Examiner* — Ling Siu Choi
*Assistant Examiner* — Olga Lucia Donahue
(74) *Attorney, Agent, or Firm* — Additon, Pendleton & Witherspoon, P.A.

(57) ABSTRACT

Disclosed are a thermoplastic resin composition and a molded product including the same, and based on 100 parts by weight of a base resin including (A) 70 wt % to 90 wt % of a polybutylene terephthalate resin and (B) 10 wt % to 30 wt % of an acrylate-based graft copolymer, the thermoplastic resin composition includes: (C) 1 part by weight to 5 parts by weight of an epoxy group-containing methacrylate-aromatic vinyl-unsaturated nitrile copolymer; (D) 15 parts by weight to 20 parts by weight of a carbon fiber; (E) 1 part by weight to 5 parts by weight of carbon nanotubes; and (F) 18 parts by weight to 20 parts by weight of aluminum diethyl phosphinate (ADEP).

20 Claims, No Drawings

(56) References Cited

FOREIGN PATENT DOCUMENTS

| | | |
|---|---|---|
| KR | 10-2013-0119954 A | 11/2013 |
| KR | 10-2014-0107119 A | 9/2014 |
| KR | 10-2015-0138228 A1 | 12/2015 |
| KR | 10-1618542 B1 | 5/2016 |
| KR | 10-2017-0039015 A | 4/2017 |
| WO | 2020/005040 A1 | 1/2020 |

* cited by examiner

THERMOPLASTIC RESIN COMPOSITION AND MOLDED PRODUCT USING SAME

CROSS-REFERENCE TO RELATED APPLICATIONS

This application claims priority to and the benefit of International Application No. PCT/KR2019/007946, filed Jul. 1, 2019, which published as WO 2020/005040 on Jan. 2, 2020; Korean Patent Application No. 10-2018-0075811, filed in the Korean Intellectual Property Office on Jun. 29, 2018; and Korean Patent Application No. 10-2019-0077961, filed in the Korean Intellectual Property Office on Jun. 28, 2019, the entire disclosure of each of which is incorporated herein by reference.

TECHNICAL FIELD

A thermoplastic resin composition and a molded product using the same are disclosed.

BACKGROUND ART

Due to environmental and energy issues, fuel economy regulations for the automobile industry have been reinforced, and in fact, based on the EU, $CO_2$ emissions have been strengthened from 160 g/km to 120 g/km as of 2015, and fines are imposed for exceeding this. In addition, the increase in automotive IT parts and safety/convenience parts has led to a 30% increase in empty vehicle weight since 1970. Furthermore, in order to commercialize electric cars such as EVs (Electric Vehicles), PHEVs (Plug-in Hybrid Electric Vehicles), and the like, the car fuel economy essentially should be improved, and accordingly, in order to solve these problems, lightweight automobiles are recognized as a significant issue in the current automobile industry, and research and development are being concentrated thereon. Low specific gravity polymer materials may efficiently contribute to reducing automobile weights, and accordingly, various automobile parts are being replaced with ones made of polymer materials and composite materials. For interior materials of automobiles, polymer materials such as ABS and PC/ABS, especially PP, have been previously developed and applied, but polymer materials for automobile structures are limitedly used due to limitations in properties.

In order to apply these polymer materials to automobile parts, various properties are required. For example, in addition to mechanical strength, heat resistance, stiffness, and aesthetic properties, as electric vehicles have been widely used in recent years, electrical properties and flame retardant properties are also increasingly required. Basically, the polymer materials unlike metals are non-conductors, and thus may cause damage to internal electronics and the like in electric vehicles due to the accumulation of static electricity on the surface of automobile parts made of the polymer materials. Accordingly, in order to make up for this, electrical conductivity, one of the electric properties, is required.

In addition, electromagnetic shielding is also an important property to block electromagnetic waves which may have a harmful effect on the human body along with malfunctions of various electronic products inside the electric vehicle, and the polymer materials in general exhibit low electromagnetic shielding performance. Accordingly, the electromagnetic shielding performance also needs to be secured.

Furthermore, as the electric vehicles are increasingly used, flame retardancy is also important. Batteries for the electric vehicles may ignite under particular situations, and the polymer materials unlike metals in general may be flammable and thus pose a serious danger in case of fire. Therefore, it is necessary to develop a polymer material securing conductivity, electromagnetic shielding performance, and flame retardancy for the purpose of reducing automobile weight.

Polybutylene terephthalate (PBT), one of the five engineering plastics for automobiles, may be easily manufactured into large-sized injection-molded parts due to excellent flowability and is also relatively easily developed into a composite material including a glass fiber, a carbon fiber, and the like due to an excellent bonding property with a filler but is limitedly applied alone due to low impact resistance. In order to make up for this, PBT is blended with various polymers, of which a representative component is an acrylonitrile-butadiene-styrene copolymer (ABS). However, since a double bond of butadiene rubber is easily decomposed by UV and degraded at a high temperature, the acrylonitrile-butadiene-styrene copolymer (ABS) also has limitations in being applied to automobile parts requiring high heat resistance. An acrylonitrile-styrene-acrylate copolymer (ASA), which is structurally similar to ABS but is substituted with acrylate rubber for the butadiene rubber, is composed of saturated polymers and thus is resistant to UV and degradation, and accordingly, may offset the disadvantages of PBT, when blended with PBT, and thus may be used for various automobile applications.

However, PBT and ASA as the polymer materials have a problem of hardly securing electrical conductivity, electromagnetic shielding performance, and flame retardancy together, as described above.

DISCLOSURE

Technical Problem

It is intended to provide a thermoplastic resin composition capable of securing all of electrical conductivity, electromagnetic shielding performance, and flame retardancy, and a molded product using the same.

Technical Solution

A thermoplastic resin composition according to an embodiment, based on 100 parts by weight of a base resin including (A) 70 wt % to 90 wt % of a polybutylene terephthalate resin and (B) 10 wt % to 30 wt % of an acrylate-based graft copolymer, includes: (C) 1 part by weight to 5 parts by weight of an epoxy group-containing methacrylate-aromatic vinyl-unsaturated nitrile copolymer; (D) 15 parts by weight to 20 parts by weight of a carbon fiber; (E) 1 part by weight to 5 parts by weight of carbon nanotubes; and (F) 18 parts by weight to 20 parts by weight of aluminum diethylphosphinate (ADEP).

An intrinsic viscosity of the (A) polybutylene terephthalate resin may be 0.36 dl/g to 1.60 dl/g.

The (B) acrylate-based graft copolymer may be a core-shell structured copolymer including a shell layer formed by graft copolymerization of an aromatic vinyl monomer and an unsaturated nitrile monomer to an acrylate-based rubber polymer core.

The (B) acrylate-based graft copolymer may include 40 wt % to 60 wt % of the acrylate-based rubber polymer core and 40 wt % to 60 wt % of a shell layer formed by graft copolymerization of the aromatic vinyl monomer and the unsaturated nitrile monomer.

The (B) acrylate-based graft copolymer may have an average particle diameter of 200 nm to 500 nm.

The (B) acrylate-based graft copolymer may be an acrylonitrile-styrene-acrylate graft copolymer (g-ASA).

The (C) epoxy group-containing methacrylate-aromatic vinyl-unsaturated nitrile copolymer may be prepared by grafting an aromatic vinyl-unsaturated nitrile copolymer to a substituted or unsubstituted glycidyl methacrylate polymer main chain.

The substituted or unsubstituted glycidyl methacrylate polymer may include an ethylene-glycidyl methacrylate copolymer.

The (C) epoxy group-containing methacrylate-aromatic vinyl-unsaturated nitrile copolymer may be obtained by grafting 30 wt % to 70 wt % of an aromatic vinyl-unsaturated nitrile copolymer with respect to 30 wt % to 70 wt % of the substituted or unsubstituted glycidyl methacrylate polymer.

The aromatic vinyl-unsaturated nitrile copolymer may be a styrene-acrylonitrile copolymer.

The styrene-acrylonitrile copolymer may be obtained by copolymerizing 60 wt % to 75 wt % of styrene, and 25 wt % to 40 wt % of acrylonitrile.

The (C) epoxy group-containing methacrylate-aromatic vinyl-unsaturated nitrile copolymer may include 5 wt % to 10 wt % of a reactive epoxy functional group.

The (D) carbon fiber may have an average length of 1 mm to 20 mm.

The (E) carbon nanotubes may include single-walled carbon nanotubes, multi-walled carbon nanotubes, or a combination thereof.

The multi-walled carbon nanotubes may have an average particle diameter of 1 nm to 20 nm and an average length of 1 μm to 10 μm.

The (F) aluminum diethylphosphinate (ADEP) may include 20 wt % to 25 wt % of phosphorus.

A molded product according to another embodiment includes the aforementioned thermoplastic resin composition.

The molded product may have an electromagnetic shielding effectiveness of greater than or equal to 30 dB measured according to ASTM D4935-99.

The molded product may have electrical conductivity of greater than or equal to $10^{-1}$ S/cm.

The molded product may have a flame retardant rating of V-0 according to the UL94 V test (UL94 vertical burning test) of a 3.0 mm thick specimen.

Advantageous Effects

The thermoplastic resin composition according to an embodiment enables manufacture of a molded product having all of improved electrical conductivity, electromagnetic shielding performance, and flame retardancy.

MODE FOR INVENTION

Hereinafter, embodiments of the present invention are described in detail. However, these embodiments are exemplary, the present invention is not limited thereto, and the present invention is defined by the scope of claims.

In the present specification, "copolymerization" means block copolymerization, random copolymerization, graft copolymerization, etc., unless otherwise defined in the specification, and "copolymer" refers to a block copolymer, a random copolymer, or a graft copolymer.

In the present specification, unless otherwise specified, the average particle diameter is a value measured using a photographic length measured by a transmission electron microscope (TEM) of a particle to be measured, and means an average value of 100 target particles.

In the present specification, unless otherwise specified, the average length refers to the arithmetic average of the length measured based on the major axis of the measurement object.

In the present specification, "substituted" means substitution with a substituent selected from a halogen group, a C1 to C30 alkyl group, a C1 to C30 haloalkyl group, a C6 to C30 aryl group, a C1 to C20 alkoxy group, and a combination thereof, and "unsubstituted" means that a hydrogen atom remains without being substituted with another substituent.

According to an embodiment, a thermoplastic resin composition, based on 100 parts by weight of a base resin including (A) 70 wt % to 90 wt % of a polybutylene terephthalate resin and (B) 10 wt % to 30 wt % of an acrylate-based graft copolymer, includes: (C) 1 part by weight to 5 parts by weight of an epoxy group-containing methacrylate-aromatic vinyl-unsaturated nitrile copolymer; (D) 15 parts by weight to 20 parts by weight of a carbon fiber; (E) 1 part by weight to 5 parts by weight of a carbon nanotubes; and (F) 18 parts by weight to 20 parts by weight of aluminum diethylphosphinate (ADEP).

Hereinafter, each component included in the thermoplastic resin composition is described in detail.

(A) Polybutylene Terephthalate Resin

The polybutylene terephthalate (PBT) resin may be polybutylene terephthalate obtained by condensation polymerization where 1,4-butanediol and terephthalic acid or dimethyl terephthalate are subjected to a direct esterification reaction or a transesterification reaction.

In addition, in order to increase impact strength of the resin, modified polybutylene terephthalate, which is a copolymer of the polybutylene terephthalate with impact-resistant components such as polytetramethylene glycol (PTMG), polyethylene glycol (PEG), polypropylene glycol (PPG), aliphatic polyester, aliphatic polyamide, and the like or a blend with these impact-resistant components, may be used.

The polybutylene terephthalate resin may have intrinsic viscosity [η] ranging from 0.36 dl/g to 1.60 dl/g, which is measured according to ASTM D2857. For example, the intrinsic viscosity of the polybutylene terephthalate resin may be in the range of 0.52 dl/g to 1.25 dl/g or 0.70 dl/g to 1.00 dl/g.

When the intrinsic viscosity of the polybutylene terephthalate resin is within the ranges, the thermoplastic resin composition may secure excellent balance between mechanical properties and moldability and excellent thermal stability.

In addition, the polybutylene terephthalate resin may have specific gravity ranging from 1.0 to 1.5. For example, the specific gravity of the polybutylene terephthalate resin may be in the range of 1.1 to 1.4, for example, 1.25 to 1.35.

The polybutylene terephthalate resin may be included in an amount of 70 wt % to 90 wt % based on a total weight of the base resin including the polybutylene terephthalate resin and an acrylate-based graft copolymer described later. When the polybutylene terephthalate resin is included within the range, excellent balance between heat resistance of a molded product formed of the thermoplastic resin composition and smoothness on the surface of the molded product may be secured.

(B) Acrylate-based Graft Copolymer

In the present invention, the acrylate-based graft copolymer may be a core-shell structured copolymer including a shell layer formed by graft copolymerization of an aromatic vinyl monomer and an unsaturated nitrile monomer to an acrylate-based rubber polymer core. Specifically, the acrylate-based graft copolymer may include 40 wt % to 60 wt % of the acrylate-based rubber polymer core and 40 wt % to 60 wt % of a shell layer formed by graft copolymerization of the aromatic vinyl monomer and unsaturated nitrile monomer. The graft copolymerization may be performed by using a conventional preparation method, for example, emulsion polymerization, suspension polymerization, solution polymerization, and bulk polymerization.

The acrylate-based rubber polymer core may be made of an alkyl acrylate-based rubber, desirably a C2 to C10 alkyl acrylate rubber. For example, a butyl acrylate rubber, an ethyl hexyl acrylate rubber, and a mixture thereof may be used, but are not necessarily limited thereto.

The acrylate-based graft copolymer may have an average particle diameter of 200 nm to 500 nm, for example, 200 nm to 400 nm, or 200 nm to 300 nm.

The average particle diameter is a value measured using a photographic length measured by a transmission electron microscope (TEM) of a target particle, and means an average value of 100 target particles.

As for the aromatic vinyl monomer grafted into the acrylate-based rubber polymer core and the unsaturated nitrile monomer, 60 wt % to 80 wt % of the aromatic vinyl monomer and 20 wt % to 40 wt % of the unsaturated nitrile monomer are included based on a total weight of the monomers.

The aromatic vinyl monomer may be styrene, α-methyl styrene, p-methyl styrene, p-t-butyl styrene, 2,4-dimethyl styrene, chloro styrene, vinyl toluene, vinyl naphthalene, and the like, which may be used alone or as a mixture. Among these, the styrene may be desirably used.

The unsaturated nitrile monomer may be acrylonitrile, methacrylonitrile, fumaronitrile, and the like, which may be used alone or a mixture. Among these, the acrylonitrile may be desirably used.

The acrylate-based graft copolymer may be desirably an acrylonitrile-styrene-acrylate graft copolymer (g-ASA).

The g-ASA may be prepared into an alkyl acrylate-based rubber through a graft-copolymerize reaction by adding acrylonitrile and styrene to the alkyl acrylate-based rubber. In the present invention, the acrylate-based graft copolymer may be included in an amount of 10 wt % to 30 wt % based on a total weight of the base resin including the polybutylene terephthalate resin (A) and the acrylate-based graft copolymer (B). When the content is less than 10 wt %, weather resistance and impact resistance may be deteriorated, but when the content is greater than 30 wt %, heat resistance may be deteriorated.

(C) Epoxy Group-Containing Methacrylate-Aromatic Vinyl-Unsaturated Nitrile Copolymer In the present invention, the epoxy group-containing methacrylate-aromatic vinyl-unsaturated nitrile copolymer may be prepared by grafting an aromatic vinyl-unsaturated nitrile copolymer to an epoxy group-containing methacrylate-based polymer main chain.

The epoxy group-containing methacrylate-based polymer may include a substituted or unsubstituted glycidyl methacrylate polymer. That is, the epoxy group-containing methacrylate-aromatic vinyl-unsaturated nitrile copolymer may be obtained by grafting an aromatic vinyl-unsaturated nitrile copolymer to the substituted or unsubstituted glycidyl methacrylate polymer main chain.

The substituted or unsubstituted glycidyl methacrylate polymer may include an ethylene-glycidyl methacrylate copolymer. The ethylene-glycidyl methacrylate copolymer may be a copolymer of an ethylene monomer and a glycidyl methacrylate monomer.

The aromatic vinyl-unsaturated nitrile copolymer grafted to the ethylene-glycidyl methacrylate copolymer main chain may be a copolymer of an aromatic vinyl monomer and an unsaturated nitrile monomer.

As the aromatic vinyl monomer, any one or more selected from styrene, a C1 to C10 alkyl substituted styrene, a halogen substituted styrene, vinyl toluene, vinyl naphthalene, and a mixture thereof may be used. Specific examples of the alkyl substituted styrene may include α-methyl styrene, p-methyl styrene, o-ethyl styrene, m-ethyl styrene, p-ethyl styrene, p-t-butyl styrene, and 2,4-dimethyl styrene.

As the unsaturated nitrile monomer, any one or more selected from acrylonitrile, methacrylonitrile, fumaronitrile, and a mixture thereof may be used.

The aromatic vinyl-unsaturated nitrile copolymer may be, for example, a copolymer of styrene and acrylonitrile, a copolymer of α-methyl styrene and acrylonitrile, or a copolymer of styrene, α-methyl styrene, and acrylonitrile, and desirably, a copolymer of styrene-acrylonitrile. For example, it may be a styrene-acrylonitrile copolymer (SAN) in which 60 wt % to 75 wt % of styrene and 25 wt % to 40 wt % of acrylonitrile are copolymerized.

For example, the epoxy group-containing methacrylate-aromatic vinyl-unsaturated nitrile copolymer may be an ethylene-glycidyl methacrylate-graft-styrene-acrylonitrile copolymer (EGMA-g-SAN). This may be a copolymer in which a styrene-acrylonitrile copolymer is grafted to an ethylene-glycidyl methacrylate copolymer main chain.

The epoxy group-containing methacrylate-aromatic vinyl-unsaturated nitrile copolymer may be obtained by grafting 30 wt % to 70 wt % of aromatic vinyl-unsaturated nitrile copolymer with respect to 30 wt % to 70 wt % of the substituted or unsubstituted glycidyl methacrylate polymer.

The epoxy group-containing methacrylate-aromatic vinyl-unsaturated nitrile copolymer may be obtained by graft-copolymerizing 30 wt % to 70 wt % of a styrene-acrylonitrile copolymer to an ethylene-glycidyl methacrylate copolymer in which 25 wt % to 55 wt % of the ethylene and 5 wt % to 15 wt % of the glycidyl methacrylate are copolymerized.

On the other hand, the epoxy group-containing methacrylate-aromatic vinyl-unsaturated nitrile copolymer may include 5 wt % to 10 wt % of a reactive epoxy functional group. When the epoxy functional group is included in an amount of less than 5 wt %, compatibility between the polybutylene terephthalate resin and the acrylate-based graft copolymer may not be secured due to an insufficient reaction with the polybutylene terephthalate resin, but when the epoxy functional group is included in an amount of more than 10 wt %, weather resistance of the thermoplastic resin composition may be deteriorated due to the unreacted epoxy functional group.

The epoxy group-containing methacrylate-aromatic vinyl-unsaturated nitrile copolymer may be included in an amount of 1 to 5 parts by weight based on 100 parts by weight of the base resin including the (A) polybutylene terephthalate resin and the (B) acrylate-based graft copolymer. When the (C) epoxy group-containing methacrylate-aromatic vinyl-unsaturated nitrile copolymer is beyond the content ranges, impact resistance and weather resistance of the thermoplastic resin composition may be deteriorated.

The thermoplastic resin composition according to an embodiment of the present invention is for improving mechanical strength and weather resistance for use in automobile interior and exterior parts, wherein the (C) epoxy group-containing methacrylate-aromatic vinyl-unsaturated nitrile copolymer may be a reactive functional group playing a role of a compatibilizer in the process of mixing the (A) polybutylene terephthalate resin and the (B) acrylate-based graft copolymer (B). In other words, the (C) epoxy group-containing methacrylate-aromatic vinyl-unsaturated nitrile copolymer may decrease the interfacial tension between the (A) polybutylene terephthalate resin and the (B) acrylate-based graft copolymer and thus improve dispersibility of the (B) acrylate-based graft copolymer and impact resistance of the thermoplastic resin composition, and accordingly, increase miscibility of the components of the thermoplastic resin composition and secure excellent molding processability.

(D) Carbon Fiber

In the present invention, the carbon fiber may impart electrical conductivity and electromagnetic shielding performance to the base resin including the (A) polybutylene terephthalate resin and the (B) acrylate-based graft copolymer.

Specifically, the carbon fibers are dispersed in any position inside the base resin, and when included over a certain amount, the dispersed carbon fibers may form conductive networks. The conductive networks may impart electrical properties, for example, electrical conductivity and electromagnetic shielding performance to the thermoplastic resin composition according to an embodiment.

The carbon fibers may have an average length ranging from 1 mm to 20 mm, for example, 3 mm to 10 mm. When the carbon fibers have an average length of less than 1 mm, the carbon fibers dispersed inside the base resin may not be electrically connected to one another, and when the carbon fibers have an average length of greater than 20 mm, they may not be processed in a general extrusion method.

The carbon fibers may be included in an amount of 15 parts by weight to 20 parts by weight based on 100 parts by weight of the base resin including (A) the polybutylene terephthalate resin and the (B) acrylate-based graft copolymer. When the carbon fibers are used in a smaller amount than the range, appropriate electrical conductivity and electromagnetic shielding performance may not be obtained, and when the carbon fibers are used in a larger amount than the range, impact strength of the thermoplastic resin composition may be deteriorated.

(E) Carbon Nanotubes

In the present invention, the carbon nanotubes may further reinforce electrical conductivity and electromagnetic shielding performance of the base resin including the (A) polybutylene terephthalate resin and the (B) acrylate-based graft copolymer.

Specifically, the carbon nanotubes may be dispersed in a conductive network wherein the aforementioned carbon fibers are electrically connected. For example, at least a portion of the carbon nanotubes may be attached to the surface of the carbon fibers and thus be hybridized. The carbon nanotubes may be attached to the surface of the conductive networks formed of the carbon fibers and more closely connect spaces of the conductive networks. In other words, the carbon nanotubes may play a role of electrically connecting adjacent carbon fibers and/or carbon nanotubes in the conductive networks. Accordingly, electrical conductivity and electromagnetic shielding performance of the conductive networks may be reinforced.

On the other hand, the thermoplastic resin composition according to an embodiment may exhibit improved flame retardancy along with electrical conductivity and electromagnetic shielding performance, as the carbon nanotubes and the carbon fibers form a hybridized conductive networks. Specifically, when heat above the ignition point is externally applied to the thermoplastic resin composition, the heat conducted to the thermoplastic resin composition may be blocked by the conductive networks in which the carbon nanotubes and the carbon fibers are closely hybridized. In other words, the conductive networks in which the carbon nanotubes and the carbon fibers are closely hybridized may prevent degradation of the resin and thus improve flame retardancy of the thermoplastic resin composition.

Examples of the carbon nanotubes usable in the thermoplastic resin composition according to an embodiment may include single-walled carbon nanotubes (SWCNT), multi-walled carbon nanotubes (MWCNT), or a combination thereof. For example, the thermoplastic resin composition according to an embodiment may use the multi-walled carbon nanotubes as the carbon nanotubes.

In an embodiment, the multi-walled carbon nanotubes may have an average particle diameter of 1 nm to 20 nm and an average length of 1 μm to 10 μm. When the average particle diameter and the average length of the multi-walled carbon nanotubes satisfy the ranges, electrical conductivity and electromagnetic wave shielding performance of the conductive networks may be reinforced to an appropriate level through hybridization with the carbon fibers.

The carbon nanotubes may be included in an amount of 1 part by weight to 5 parts by weight based on 100 parts by weight of the base resin including the (A) polybutylene terephthalate resin and the (B) acrylate-based graft copolymer. When the carbon nanotubes are included at less than the range, electrical conductivity and electromagnetic shielding performance at an appropriate level may not be obtained, and impact strength of the thermoplastic resin composition may be deteriorated in many cases.

(F) Aluminum Diethylphosphinate

In the present invention, the aluminum diethylphosphinate (ADEP) plays a role of imparting a certain level of flame retardancy to the thermoplastic resin composition. Specifically, the aluminum diethylphosphinate is mixed along with the conductive networks where the aforementioned carbon nanotubes and carbon fiber are hybridized in the aforementioned base resin and thus may improve flame retardancy of the thermoplastic resin composition.

The aluminum diethylphosphinate may include 20 wt % to 25 wt % of phosphorus.

The aluminum diethylphosphinate may be included in an amount of 18 parts by weight to 20 parts by weight based on 100 parts by weight of the base resin including the (A) polybutylene terephthalate resin and the (B) acrylate-based graft copolymer. When the aluminum diethylphosphinate is included within the range along with the conductive networks, excellent flame retardancy may be imparted to the thermoplastic resin composition.

On the other hand, when the aluminum diethylphosphinate is included at less than the range, the effect of improving the flame retardancy of the thermoplastic resin composition may be insufficient, and heat-resistant properties and impact strength of the thermoplastic resin composition may be deteriorated.

(G) Other Additives

Meanwhile, the thermoplastic resin composition according to an embodiment may further include other additives such as dyes, pigments, fillers, antioxidants, heat stabilizers, UV stabilizers, lubricants, antibacterial agents, and release agents, and these additives may be used alone or in a mixture of two or more types.

The other additives may be included within a range of 0 to 50 parts by weight based on 100 parts by weight of the base resin including the (A) polybutylene terephthalate resin and the (B) acrylate-based graft copolymer.

On the other hand, another embodiment provides a molded product including the thermoplastic resin composition according to the embodiment. The molded product may be manufactured by various methods known in the art such as injection molding and extrusion molding using the thermoplastic resin composition.

According to another embodiment, the molded product may have an electromagnetic shielding effectiveness of greater than or equal to 30 dB, for example, greater than or equal to 31 dB, which is measured according to ASTM D4935-99.

According to another embodiment, the molded product may exhibit electrical conductivity of greater than or equal to $10^{-1}$ S/cm, for example, greater than or equal to 0.3 S/cm.

According to another embodiment, the flame retardant rating according to the UL 94 V test (UL 94 vertical burning test) of the 3.0 mm thick specimen may satisfy V-0.

In other words, the molded product according to an embodiment includes the aforementioned thermoplastic resin composition and thus may secure excellent electrical conductivity, electromagnetic shielding performance, and flame retardancy. Accordingly, the molded product having the aforementioned properties may be used for various electric/electronic parts, building materials, sporting goods, and automotive parts, and specifically, various interior parts of electric vehicles requiring electrical properties and flame retardant properties, for example, battery cases and the like inside the electric vehicles. However, the use of the molded product is not limited thereto.

Hereinafter, the present invention is illustrated in more detail with reference to examples and comparative examples. However, the following examples and comparative examples are provided for the purpose of descriptions and the present invention is not limited thereto.

Examples 1 to 6 and Comparative Examples 1 to 7

The thermoplastic resin compositions of Examples 1 to 6 and Comparative Examples 1 to 7 were prepared in each component content ratio shown in Table 1.

In Table 1, components consisting of a base resin were marked by wt % based on a total weight of the base resin, and (C) EGMA-g-SAN, (D) carbon fiber, (E) MWCNT, and (F) ADEP, which were added to the base resin, were marked by parts by weight based on 100 parts by weight of the base resin.

The components provided in Table 1 were mixed and then extruded/processed to prepare pellet-shaped thermoplastic resin compositions. The extrusion was conducted by using a twin-screw extruder with L/D=29 and a diameter of 45 mm and setting a barrel temperature at 240° C. The obtained pellets were dried at 80° C. for 4 hours and then manufactured into specimens for evaluating flame retardancy by using a 6 oz injection-molding machine and setting a cylinder temperature at 240° C. and a mold temperature at 60° C.

On the other hand, the manufactured pellets were pressed with a hot press at 240° C. to manufacture 15 mm-wide×25 mm-long×0.2 mm-thick film-shaped specimens for evaluating electrical conductivity.

On the other hand, each manufactured pellet was charged in a 22.8 mm-wide×10.1 mm-long×2.0 mm-thick mold and then put in a 250° C. hot press and pressed to obtain specimens with the above size for evaluating electromagnetic shielding performance.

TABLE 1

|  | Examples | | | | | | Comparative Examples | | | | | | |
| --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 |
| Polybutylene terephthalate resin (PBT) (A) | 70 | 70 | 70 | 90 | 70 | 70 | 70 | 70 | 70 | 70 | 70 | 50 | 70 |
| Acrylonitrile-styrene-acrylate graft copolymer (g-ASA) (B) | 30 | 30 | 30 | 10 | 30 | 30 | 30 | 30 | 30 | 30 | 30 | 50 | 30 |
| Ethylene-glycidyl methacrylate-graft-styrene-acrylonitrile copolymer (EGMA-g-SAN) (C) | 3 | 3 | 3 | 3 | 1 | 5 | 3 | 3 | 3 | 3 | 3 | 3 | 3 |
| Carbon fiber (D) | 19 | 17.5 | 15 | 19 | 19 | 19 | 20 | 0 | 19 | 19 | 14 | 19 | 0 |
| Multi-walled carbon nanotubes (MWCNT) (E) | 1 | 2.5 | 5 | 1 | 1 | 1 | 0 | 5 | 1 | 1 | 1 | 1 | 0 |
| Aluminum diethylphosphinate (ADEP) (F) | 20 | 20 | 20 | 20 | 20 | 20 | 20 | 20 | 15 | 10 | 20 | 20 | 20 |

(A) Polybutylene Terephthalate Resin (PBT)
A polybutylene terephthalate resin having specific gravity of 1.31 and intrinsic viscosity of 0.83 dl/g was used. [Manufacturer: Shinkong Synthetic Fibers Corp., Product Name: K001]

(B) Acrylonitrile-styrene-acrylate Graft Copolymer (g-ASA)
A core-shell structured copolymer consisting of 60 wt % of a butyl acrylate rubber core and 40 wt % of a shell, wherein the shell was formed of an acrylonitrile-styrene-acrylate graft copolymer consisting of 28 wt % of styrene and 12 wt % of acrylonitrile as a styrene-acrylonitrile copolymer and having an average particle diameter of about 300 nm, was used. [Manufacturer: UMG ABS Ltd., Product Name: A600N]

(C) Ethylene-Glycidyl Methacrylate-graft-Styrene-Acrylonitrile Copolymer (EGMA-g-SAN)
A copolymer which included about 8 wt % of a reactive epoxy functional group based on a total weight of the copolymer and in which a styrene-acrylonitrile copolymer was grafted to an ethylene-glycidyl methacrylate copolymer main chain was used. [Manufacturer: NOF Corp., Product Name: A4400]

(D) Carbon Fiber
Carbon fiber with an average length of 6 mm was used. [Manufacturer: ACE C & Tech. Co., Ltd., Product Name: ACECA-EP]

(E) Multi-Walled Carbon Nanotubes (MWCNT)
Multi-walled carbon nanotubes with an average particle diameter of 9.5 nm and an average length of 1.5 μm were used. [Manufacturer: Nanocyl SA, Product Name: NC7000]

(F) Aluminum Diethylphosphinate (ADEP)
Aluminum diethylphosphinate including about 23 wt % of phosphorus and having a density of about 1.2 g/cm$^3$ as a non-halogen phosphorus flame retardant including aluminum as a salt was used. [Manufacturer: Henan Sinotech Import & Export Corp., Product Name: PFR-SN3020]

Experimental Examples

Experiment results are shown in Table 2.
(1) Electrical conductivity (S/cm): A four-probe method was used. Specifically, a probe with a pin distance of 1.5 mm was made to contact specimens for evaluating electrical conductivity, a resistivity meter with a voltage limit of 90 V was used to measure sheet resistance of the specimens, and then this sheet resistance was converted into electrical conductivity to obtain electrical conductivity of each specimen.
(2) Electromagnetic shielding effectiveness (dB): A WR-90 waveguide and an ENA vector network analyzer were used to measure the electromagnetic shielding effectiveness of each specimen within the frequency range of 8.2 GHz to 12.4 GHz according to the ASTM D4935-99 standard.
(3) Flame retardancy: According to UL94 V (UL94 vertical test), five specimens each with a thickness of 3.0 mm were evaluated in each case, and flame retardancy thereof was ranked according to UL94 V references.

TABLE 2

| | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|---|---|---|
| Electrical conductivity (S/cm) | 0.38 | 0.72 | 1.02 | 0.52 | 0.41 | 0.36 | 0.08 | $10^{-7}$ | 0.56 | 0.71 | $10^{-3}$ | 0.28 | $10^{-14}$ |
| Electromagnetic shielding effectiveness (dB) | 32.0 | 33.8 | 34.6 | 32.6 | 32.1 | 31.8 | 27.9 | — | 32.8 | 33.7 | — | 30.2 | — |
| Flame retardancy | V-0 | V-0 | V-0 | V-0 | V-0 | V-0 | V-2 | Fail | V-2 | Fail | V-1 | Fail | Fail |

Referring to Tables 1 and 2, as shown in Examples 1 to 6, molded products formed of compositions including the (A) polybutylene terephthalate resin, (B) the acrylate-based graft copolymer, (C) the ethylene-glycidyl methacrylate-aromatic vinyl-unsaturated nitrile copolymer, (D) the carbon fiber, (E) the carbon nanotubes, and (F) the aluminum diethylphosphinate within each range according to an embodiment may simultaneously secure excellent electrical conductivity, electromagnetic shield performance, and flame retardancy compared with the comparative examples.

The present invention has been described through preferred embodiments as described above, but the present invention is not limited thereto, and various modifications and variations are possible without departing from the concept and scope of the following claims, which may be easily understood by a person skilled in the technical field of the present invention.

The invention claimed is:
1. A thermoplastic resin composition, based on 100 parts by weight of a base resin, comprising
   (A) 70 wt % to 90 wt % of a polybutylene terephthalate resin and
   (B) 10 wt % to 30 wt % of an acrylate-based graft copolymer, comprising;
   (C) 1 part by weight to 5 parts by weight of an epoxy group-containing methacrylate-aromatic vinyl-unsaturated nitrile copolymer;
   (D) 15 parts by weight to 20 parts by weight of a carbon fiber;
   (E) 1 part by weight to 5 parts by weight of carbon nanotubes; and
   (F) 18 parts by weight to 20 parts by weight of aluminum diethylphosphinate.
2. The thermoplastic resin composition of claim 1, wherein the (A) polybutylene terephthalate resin has an intrinsic viscosity of 0.36 dl/g to 1.60 dl/g.
3. The thermoplastic resin composition of claim 1, wherein the (B) acrylate-based graft copolymer is a core-shell structured copolymer including a shell layer formed by graft copolymerization of an aromatic vinyl monomer and an unsaturated nitrile monomer to an acrylate-based rubber polymer core.

4. The thermoplastic resin composition of claim 3, wherein the (B) acrylate-based graft copolymer comprises 40 wt % to 60 wt % of the acrylate-based rubber polymer core and 40 wt % to 60 wt % of a shell layer formed by graft copolymerization of the aromatic vinyl monomer and the unsaturated nitrile monomer.

5. The thermoplastic resin composition of claim 1, wherein the (B) acrylate-based graft copolymer has an average particle diameter of 200 nm to 500 nm.

6. The thermoplastic resin composition of claim 1, wherein the (B) acrylate-based graft copolymer is an acrylonitrile-styrene-acrylate graft copolymer (g-ASA).

7. The thermoplastic resin composition of claim 1, wherein the (C) epoxy group-containing methacrylate-aromatic vinyl-unsaturated nitrile copolymer is obtained by grafting an aromatic vinyl-unsaturated nitrile copolymer to a substituted or unsubstituted glycidyl methacrylate polymer main chain.

8. The thermoplastic resin composition of claim 7, wherein the substituted or unsubstituted glycidyl methacrylate polymer comprises an ethylene-glycidyl methacrylate copolymer.

9. The thermoplastic resin composition of claim 7, wherein the (C) epoxy group-containing methacrylate-aromatic vinyl-unsaturated nitrile copolymer is obtained by grafting 30 wt % to 70 wt % of the aromatic vinyl-unsaturated nitrile copolymer with respect to 30 wt % to 70 wt % of the substituted or unsubstituted glycidyl methacrylate polymer.

10. The thermoplastic resin composition of claim 7, wherein the aromatic vinyl-unsaturated nitrile copolymer is a styrene-acrylonitrile copolymer.

11. The thermoplastic resin composition of claim 10, wherein
the styrene-acrylonitrile copolymer is obtained by copolymerizing 60 wt % to 75 wt % of styrene, and
25 wt % to 40 wt % of acrylonitrile.

12. The thermoplastic resin composition of claim 1, wherein the (C) epoxy group-containing methacrylate-aromatic vinyl-unsaturated nitrile copolymer comprises 5 wt % to 10 wt % of a reactive epoxy functional group.

13. The thermoplastic resin composition of claim 1, wherein the (D) carbon fiber has an average length of 1 mm to 20 mm.

14. The thermoplastic resin composition of claim 1, wherein the (E) carbon nanotubes comprise single-walled carbon nanotubes, multi-walled carbon nanotubes, or a combination thereof.

15. The thermoplastic resin composition of claim 14, wherein the multi-walled carbon nanotubes have an average particle diameter of 1 nm to 20 nm and an average length of 1 μm to 10 μm.

16. The thermoplastic resin composition of claim 1, wherein the (F) aluminum diethylphosphinate comprises 20 wt % to 25 wt % of phosphorus.

17. A molded product comprising the thermoplastic resin composition of claim 1.

18. The molded product of claim 17, wherein the molded product has an electromagnetic shielding effectiveness of greater than or equal to 30 dB measured according to ASTM D4935-99.

19. The molded product of claim 17, wherein the molded product has electrical conductivity of greater than or equal to $10^{-1}$ S/cm.

20. The molded product of claim 17, wherein the molded product has a flame retardant rating of V-0 according to the UL94 V test (UL94 vertical burning test) of a 3.0 mm thick specimen.

* * * * *